US010229276B2

United States Patent
Lester

(10) Patent No.: US 10,229,276 B2
(45) Date of Patent: Mar. 12, 2019

(54) METHOD AND APPARATUS FOR DOCUMENT AUTHOR CONTROL OF DIGITAL RIGHTS MANAGEMENT

(75) Inventor: James Lester, Dublin, CA (US)

(73) Assignee: ADOBE INC., San Jose, CA (US)

( * ) Notice: Subject to any disclaimer, the term of this patent is extended or adjusted under 35 U.S.C. 154(b) by 2099 days.

(21) Appl. No.: 11/423,688

(22) Filed: Jun. 12, 2006

(65) Prior Publication Data

US 2007/0288385 A1     Dec. 13, 2007

(51) Int. Cl.
*G06F 21/10*     (2013.01)
*G06F 21/51*     (2013.01)
*G06F 21/62*     (2013.01)

(52) U.S. Cl.
CPC .......... *G06F 21/6209* (2013.01); *G06F 21/10* (2013.01); *G06F 21/51* (2013.01)

(58) Field of Classification Search
CPC ...... G06F 9/445; G06F 11/30; G06F 21/6209; G06F 21/10; G06F 21/51; G06Q 20/123; G06Q 20/235; G06Q 50/184; G06Q 2220/16
USPC .................................. 713/2, 193; 705/50–79
See application file for complete search history.

(56) References Cited

U.S. PATENT DOCUMENTS 5,892,900 A * 4/1999 Ginter ..................... G06F 21/10
726/26
6,119,108 A * 9/2000 Holmes .................. G06Q 30/06
705/18
6,327,652 B1 * 12/2001 England ................ G06F 9/4406
713/2

(Continued)

FOREIGN PATENT DOCUMENTS

EP     0978839 A1     2/2000
EP     1132796 A1     9/2001

(Continued)

OTHER PUBLICATIONS (Koenen, "The Long March to Interoperable Digital Rights Management", attached as PDF file), available at https://ieeexplore.ieee.org/stamp/stamp.jsp?tp=&arnumber=1299164 (Year: 2003).*

(Continued)

*Primary Examiner* — James D Nigh
*Assistant Examiner* — Margaret M Neubig
(74) *Attorney, Agent, or Firm* — Shook, Hardy & Bacon, L.L.P.

(57) ABSTRACT

Method, apparatus, computer programs and data structures are provided, according to at least one embodiment, wherein an author of digital content identifies at least some trusted code that the author trusts to be used to read digital content, and stores information in the unit of digital content that is capable of identifying the trusted code. In at least some embodiments, the unit of digital content is an electronic document. In other embodiments, a publisher of the trusted code, or an author of the digital content, signs the trusted code with a private key, and a certificate associated with the private key is embedded in the unit of digital content. The certificate may provide public key information associated with the private key. The public key may be used to verify that code is trusted before it is allowed access to the unit of digital content.

13 Claims, 7 Drawing Sheets

(56) References Cited

U.S. PATENT DOCUMENTS

| | | | | |
|---|---|---|---|---|
| 6,742,176 | B1* | 5/2004 | Million | G06F 21/10 717/120 |
| 6,766,305 | B1* | 7/2004 | Fucarile | G06F 21/10 705/317 |
| 6,934,909 | B2* | 8/2005 | Tewari | G06F 17/218 715/234 |
| 7,213,266 | B1* | 5/2007 | Maher | G06Q 10/10 726/26 |
| 7,406,603 | B1* | 7/2008 | MacKay | G06F 21/10 713/193 |
| 2002/0018566 | A1* | 2/2002 | Kawatsura | G06F 21/10 380/232 |
| 2002/0026478 | A1* | 2/2002 | Rodgers | G06F 8/65 709/205 |
| 2002/0077988 | A1* | 6/2002 | Sasaki | G06F 21/10 705/59 |
| 2002/0144138 | A1* | 10/2002 | Maliszewski | G06F 21/10 726/3 |
| 2003/0191944 | A1* | 10/2003 | Rothrock | G06F 21/10 713/182 |
| 2004/0187014 | A1* | 9/2004 | Molaro | G06F 21/10 726/27 |
| 2005/0262568 | A1* | 11/2005 | Hansen | G06F 21/10 726/26 |
| 2007/0022469 | A1* | 1/2007 | Cooper | H04K 1/00 726/3 |

FOREIGN PATENT DOCUMENTS

| | | |
|---|---|---|
| EP | 1376302 A2 | 1/2004 |
| WO | WO-2007146283 A2 | 12/2007 |
| WO | WO-2007146283 A3 | 12/2007 |

OTHER PUBLICATIONS

"International Application Serial No. PCT/US2007/013775, International Search Report dated Mar. 25, 2008", 6 pgs.

"International Application Serial No. PCT/US2007/013775, Written Opinion dated Mar. 25, 2008", 5 pgs.

\* cited by examiner

| 410 ↴ | TRUSTED CODE INFORMATION ID | |
|---|---|---|
| 420 ↴ | TRUSTED CODE ID | CERTIFICATE | ~430
| | TRUSTED CODE ID | CERTIFICATE | ~430
| | ⋮ | ⋮ |
| | TRUSTED CODE ID | CERTIFICATE | ~430

| SELECT TRUSTED CODE | | |
|---|---|---|
| GO | TRUSTED CODE ITEMS | DESCRIPTION |
| ☐ | A | • • • |
| ☐ | B | • • • |
| ⋮ | ⋮ | ⋮ |
| ☐ | N | • • • |

(400 labels point to each row)

*FIG. 4B*

METHOD AND APPARATUS FOR DOCUMENT AUTHOR CONTROL OF DIGITAL RIGHTS MANAGEMENT

TECHNICAL FIELD

The subject matter relates generally to the field of digital rights management, and more particularly to controlling access to digital content.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006, Adobe Systems Inc. All Rights Reserved.

BACKGROUND

Digital rights management (DRM), as its name implies, applies to digital media. Digital media encompasses digital audio, digital video, the World Wide Web, and other technologies that can be used to create, refer to, and distribute digital "content." Digital media represents a major change from all previous media technologies. Post-production of digital media is cheaper and more flexible than that of analog media, and the end result can be reproduced indefinitely without any loss of quality. Furthermore, digital content can be combined to make new forms of content. The first signs of this are visible in the use of techniques such as sampling and remixing in the music industry.

Digital media have gained in popularity over analog media both because of technical advantages associated with their production, reproduction, and manipulation, and also because they are sometimes of higher perceptual quality than their analog counterparts. Since the advent of personal computers, digital media files have become easy to copy an unlimited number of times without any degradation in the quality of subsequent copies. Many analog media lose quality with each copy generation, and often even during normal use.

The popularity of the Internet and file sharing tools has made the distribution of digital media files simple. The ease with which they can be copied and distributed, while beneficial in many ways, presents both a security risk and a threat to the value of copyrighted material contained in the media. Although technical control measures on the reproduction and use of application software have been common since the 1980s, DRM usually refers to the increasing use of similar measures for artistic and literary works, or copyrightable content in general. Beyond the existing legal restrictions which copyright law imposes on the owner of the physical copy of a work, most DRM schemes can, and do, enforce additional restrictions at the sole discretion of the media distributor (which may or may not be the same entity as the copyright holder).

DRM vendors and publishers coined the term digital rights management to refer to various types of measures to control access to digital content, as for example discussed herein, but not limited to those measures discussed herein. DRM may be thought of as a variant of mandatory access control wherein a central policy set by an administrator is enforced by a computer system. Rights management systems allow a policy to be associated with a unit of digital content, such as an electronic document. This policy may be unique for the unit of digital content or it may be used for multiple units of digital content.

BRIEF DESCRIPTION OF THE DRAWING

FIG. 4A illustrates a list specifying trusted code according to one example embodiment of the inventive subject matter disclosed herein;

FIG. 4B illustrates a user interface according to one example embodiment of the inventive subject matter disclosed herein;

DETAILED DESCRIPTION

In the following detailed description, reference is made to the accompanying drawings that form a part hereof, and in which are shown, by way of illustration, specific embodiments in which the inventive subject matter can be practiced. It is understood that other embodiments may be utilized and structural changes may be made without departing from the scope of the inventive subject matter. The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
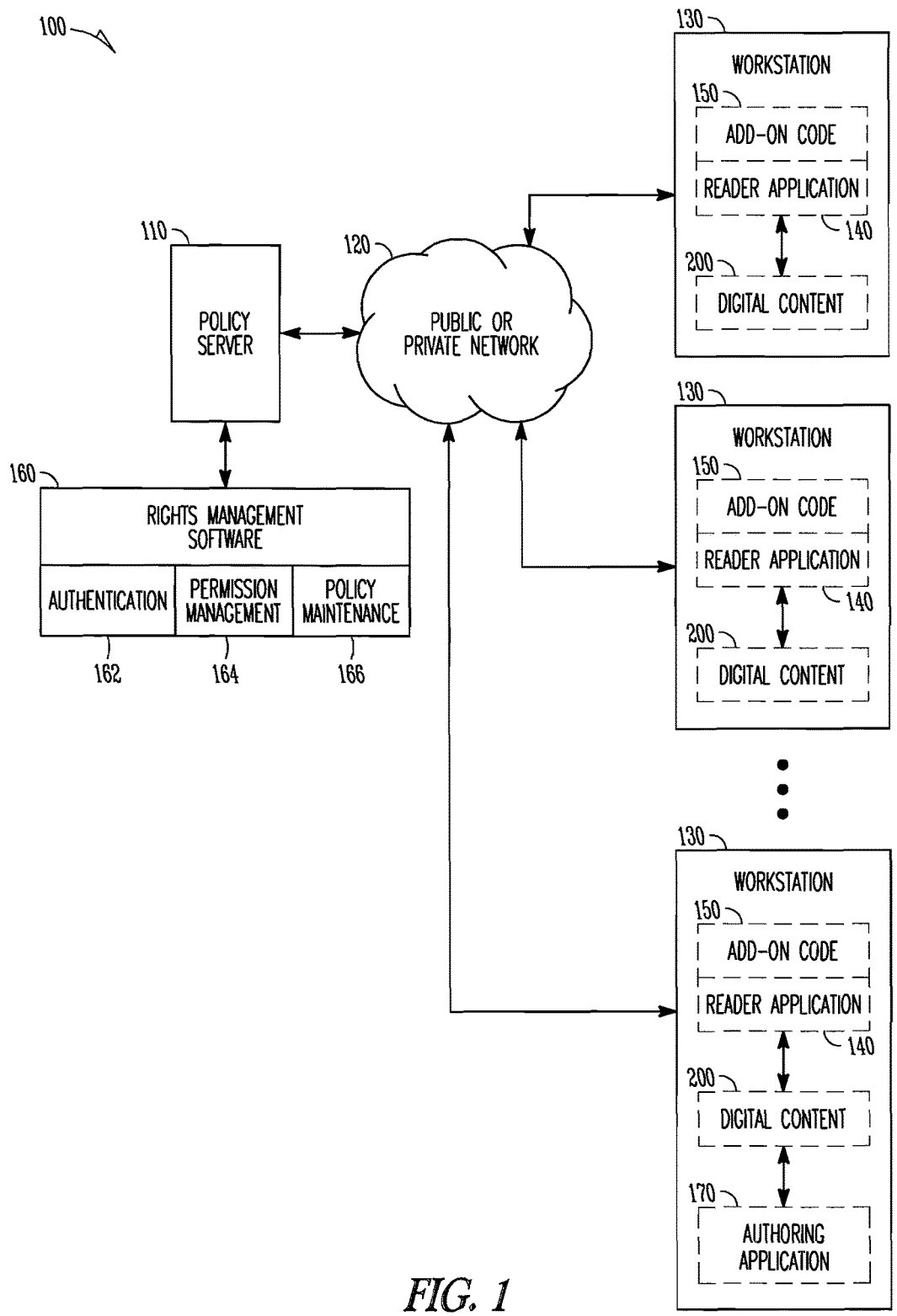
FIG. 1 illustrates a system according to one example embodiment of the inventive subject matter disclosed herein.

Referring now to FIG. 1 there is illustrated an overview of a first example embodiment of a digital rights management (DRM) system 100. Digital rights management system 100 may be used to effectuate and support a digital rights management scheme in which digital rights are distributed, accessed, and protected according to an established digital rights management infrastructure. The digital rights management scheme and infrastructure may include a number of characteristics including one or more rules, policies, data structures, or methods used to effectuate the scheme, as for example described herein. DRM system 100 may include or use a policy server 110, one or more networks 120, such as private or public networks, and a plurality of workstation computers 130, such as, but not limited to, personal computers, and reader applications 140 operating on the workstation computers 130. Reader application 140, in one example embodiment, is a client application that opens digital content that may be stored in a unit of digital content 200, such as a document, and enforces permissions. Reader application may take the form of, for example but not by way of limitation, the Adobe Acrobat® line of programs, available from Adobe Systems, Inc. According to one example embodiment, add-on or additional code 150 may work in conjunction with the reader application 140 and also attempt to gain access to the unit of digital content 200. Additional code 150 may be a loadable library or other code working in conjunction with the reader application 140, for example so-called "plug-in" code or computer programs. A plug-in may be a computer program that can, or may, interact with the reader application 140 to provide a certain, usually very specific, function. The reader application 140 may provide a way for plug-ins to register themselves, and a protocol by which data is exchanged with the plug-ins. According to another example embodiment, the additional code 150 may not work in conjunction with the reader application 140.

Policy server 110 includes digital rights management software 160 for defining policies, associating policies to a unit of digital content 200, authenticating users 162, and permission management 164, for example through interaction with the reader applications 140, and policy maintenance functions 166. System 100 may further include an authoring software application 170 that may be distributed to users to use to create units of digital content 200 and manage digital rights associated with such units of content 200, such as what code is trusted to read or access the unit of digital content. One such authoring application 170 is illustrated on one of the workstations 130 in FIG. 1. Authoring application 170, in one example embodiment, is a client application that may be used to create digital content, such as a document, and assign permissions, such as, for example but not by way of limitation, the Adobe Acrobat® line of programs, available from Adobe Systems, Inc.

According to one example embodiment, the code of reader application 140 and authoring application 170 is certified in accordance with procedures or standards established for the digital rights management system 100. In one example embodiment, the DRM system 100 is arranged and configured such that any unit of digital content 200 created by the authoring application 170 may be at least partially accessed by the reader application 140. The code of reader application 140 is, accordingly, in at least one sense, trusted by any unit of digital content 200 created by the authoring application 170 to safely access and/or write to or otherwise manipulate the unit of digital content 200 in accordance with any applicable rights or policies. In this sense, the code of reader application 140 may be said to be universally trusted by any unit of digital content 200 created using the digital rights management system 100. Notwithstanding the foregoing, according to other example embodiments, the digital rights management system 100 may include more than one class or type of reader applications or authoring applications, and different data structures for units of digital content, such that the ability of a particular reader application to access a unit of digital content may depend further on which class or type is being used.

Figures 2, 3:
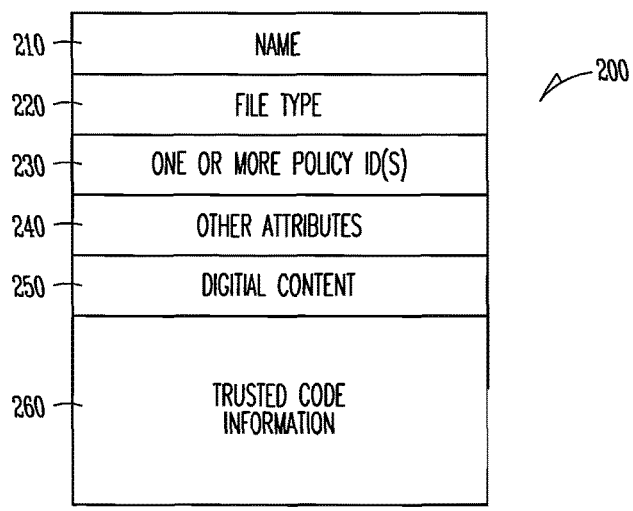
FIG. 2 illustrates digital content according to one example embodiment of the inventive subject matter disclosed herein.
FIG. 3 illustrates a digital rights management policy according to one example embodiment of the inventive subject matter disclosed herein.

Referring to FIG. 2, there is illustrated one example embodiment of a unit of digital content 200. Unit 200 may, by way of example but not limitation, take the form of an electronic document, for instance in a portable document format (PDF) as is made available by Adobe Systems Inc., or the form of a digital music file, digital audiovisual work file, or any other type of digital file that contains content that a user may seek to access. Unit 200, for example, but not by way of limitation, may have a data structure that includes the following components: i) a name 210; ii) indication of file type 220, such as PDF, Word document, Excel spreadsheet, or other type of file; iii) the identification 230 of a rights management policy 300 (described further below) associated with the document, or a copy of the actual policy; iv) other attributes 240; v) digital content 250 such as a document, illustration, music, audiovisual work, or any other media in digital form; and vi) trusted code information 260 specifying code, such as additional code 150, that is trusted to access the digital content 250. Alternatively, trusted code information 260 may specify a trusted code policy that does not require identification of specific items of trusted code but may still govern what code is trusted to access the unit of digital content. The data structure of the unit of digital content 200 is supported by the digital rights management system 100 such that reader applications 140 that are compatible with or compliant with a standard established for the digital rights management system 100 are able to access, for example open, read, and write to, such data structures. Such standard may be established by a publisher or sponsor of the digital rights management system, for example by one or more commercial entity or one or more non-profit entities such as but not limited to standards bodies.

Referring now to FIG. 3, there is illustrated one example embodiment of a digital rights management policy 300. Policy 300 has an ID (e.g., name) 310, and specifies, for example, one or more permissions relating to digital content. For example but not by way of limitation, such permissions may specify, for each of one or more roles 320 (A, B, . . . N), the following: i) rights to access and view the content 330; ii) rights to copy the content 340; iii) rights to modify or add to the content 350; and/or iv) other rights 360. As noted above, according to one example embodiment, a unit of digital content 200 may not be governed by a policy 300, such that there are no restrictions on who can access or use the respective digital content. According to another example embodiment, a policy 300 may be associated with a unit of digital content 200, for example by tracking an association of the digital content 200 with a policy 300 on the policy server 110, or by replication of the policy 300 in the unit of digital content 200. According to one example embodiment, a unit of digital content 200 may or may not include a digital rights management policy 300. Further, if the unit of digital content 200 has associated with it a digital rights management policy 300 requiring rights management for the unit of digital content 200, such rights are enforced by the reader application 140 and/or the policy server 110. For example, if such a policy 300 requires authentication of a user, the user is authenticated to the policy server 110 before access to the content is allowed by the reader application 140.

According to one example embodiment of the inventive subject matter, the DRM system 100 allows an author, publisher or other creator of a unit of digital content 200 to specify trusted code, such as code 150, for example identified in a trusted code list 420 as illustrated in FIG. 4A

(described in more detail below), that is trusted to access the unit of digital content 200. According to one example embodiment, trusted code, such as code 150, is not trusted by the DRM system 100 as a whole. Such a system 100 may otherwise provide security for digital content either through being a closed system to which nothing can be added, or through the use of code signing by which only code trusted by the DRM system 100 as a whole can run. According to one example embodiment as indicated with respect to FIG. 2, the unit of digital content 200 may include trusted code information 260 that specifies or is used to authenticate or certify code trusted to access and use the digital content carried in the unit of digital content 200. Reader applications 140, or other applications opening the unit of digital content 200 that enforce digital rights management for the unit 200, use the trusted code information 260 to verify that all or at least some of the code having access to the unit of content 200 is trusted. Accordingly, as described in more detail below, in one example embodiment, the author or publisher of the unit of digital content 200 may specify trusted code from any source. For example but not by way of limitation, the trusted code may be published or distributed by the author of the unit of digital content 200, by the publisher of software used in the digital rights management system 100, or by an independent third party.

Referring further to FIG. 4A, there is illustrated one example embodiment of trusted code information 260. Trusted code information 260 may include an ID (e.g. name) 410, and specifies, for example, the identity/name or means to identify one or more items of trusted code in a list 420. For example but not by way of limitation, such identification may be accomplished using a public key from a digital certificate 430 that can be used to authenticate trusted code using a PKI scheme, as described in more detail below with respect to FIG. 7. A list 420 may be associated with a unit of digital content 200, by replication of the list 420 in the unit of digital content 200, or, for example, by tracking an association of the unit of digital content 200 with a copy of the list 420 kept on the policy server 110, or both. Further, the trusted code information 260 may be encrypted in the unit of digital content 200.

According to one example embodiment, as shown in FIG. 4B, system and method are provided to specify trusted code or a trusted code policy to be used with a unit of digital content 200. The identification/name of one or more available items of trusted code, such as code 150 illustrated in FIG. 1, are displayed in a user interface 450 by policy creating and maintenance functions 166 that may run on the policy server 110 and/or alternatively run on a workstation computer 130. User interface 450 provides an interface that allows a user such as a policy administrator, creator, or editor, to select one or more of the items of trusted code to use with a unit of digital content 200. Alternatively, the interface 450 may display a trusted code policy to be selected by the user. Such a policy may specify, for example, that there is no additional trusted code for this unit of digital content 200. According to one example embodiment, the selected items of trusted code are used to form the trusted code list 420 that may be incorporated in the unit of digital content 200. According to still another example embodiment, digital content in the unit of digital content 200 is encrypted, and the list 420 of trusted code, and the associated digital certificates 430, may also be encrypted.

Figure 5:
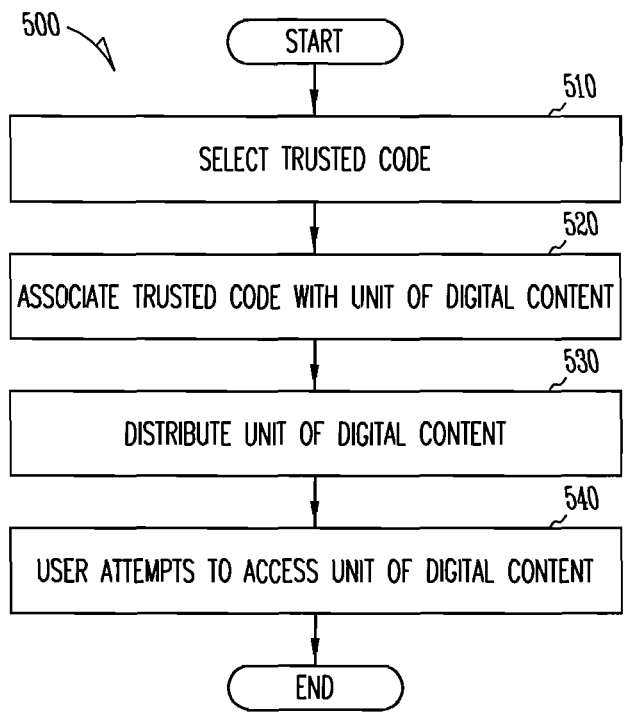
FIG. 5 illustrates a flow chart of an example embodiment of a method according to the inventive subject matter disclosed herein.

Referring now to FIG. 5, for example but not by way of limitation, to create a specific trusted code list 420, as illustrated in the flow chart 500, one or more items of trusted code may be selected 510, for example using a pointing device in a graphical user interface, or alternatively by specifying the name of the trusted code. The maintenance functions 166, for example, may, in one embodiment, associate 520 one or more items of trusted code to the list 420 for a specific unit of digital content 200. The particular unit of digital content 200 may be distributed to more than one content user 530, and a content user may attempt to access 540 the particular unit of digital content 200.

Figure 6:
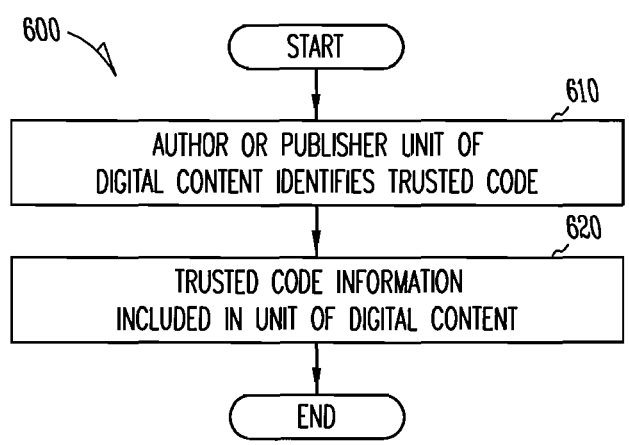
FIG. 6 illustrates a flow chart of a further method according to one example embodiment of the inventive subject matter disclosed herein.

Referring now to FIG. 6, there is illustrated one more example embodiment 600 of a method according to the inventive subject matter. Embodiment 600 provides for an author or other entity to identify 610 at least some trusted code that the entity trusts to be used to read digital content contained in a unit of digital content 200. Trusted code information 260 is then stored 620 in the unit of digital content 200, wherein the trusted code information 260 may be used to identify or certify code trusted to access the digital content. Trusted code information 260 may be embedded or stored in the unit of digital content 200, or the information 260 may alternatively or in addition be stored on the policy server 110, and read by the reader application when required.

Figure 7:
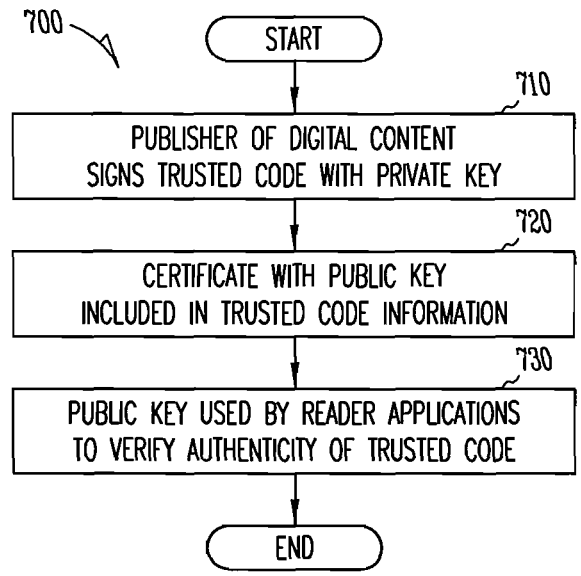
FIG. 7 illustrates a flow chart of a further method according to one example embodiment of the inventive subject matter disclosed herein.

According to still another example embodiment 700 illustrated in FIG. 7, a publisher of digital content 400 may sign 710 the trusted code, which may be published by a different party than the publisher of the digital content or the publisher of the DRM system, with a digital signature, such as a private key associated with a digital certificate 430, and the digital certificate 430 is embedded or otherwise included 720 in the unit of digital content 200. A public key associated with the certificate 430 is then used by the reader application 140 to verify 730 that code attempting to access the unit 200 is trusted. According to one example embodiment, but not by way of limitation, a public key infrastructure (PKI) system such as one compliant with the X.509 industry standard is used to support the code signing and digital certificates.

Figure 8:
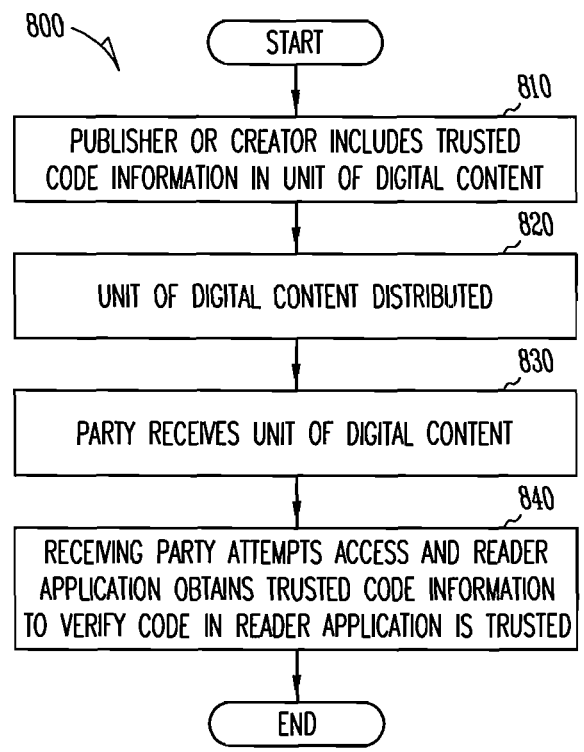
FIG. 8 illustrates a flow chart of a further method according to one example embodiment of the inventive subject matter disclosed herein.

Referring now to FIG. 8, there is illustrated another example embodiment 800 of the inventive subject matter disclosed herein. A publisher of a unit of digital content 200 includes 810 trusted code information 260 in the unit of digital content 200. The publisher distributes 820 the unit of digital content to a receiving party who receives 830 the unit of digital content 200. According to this embodiment, the unit of digital content 200 includes (i) digital content to be accessed by the receiving entity, and (ii) information capable of identifying code that can be trusted for the purpose of accessing the digital content. The receiving party may attempt to access 840 the received unit of digital content 200, and a reader application 140 used by the receiving party may read the unit of digital content 200 to obtain the trusted code information 260, which can then be used to verify that any code attempting to access the unit of digital content 200 is trusted. According to one example embodiment applicable to all embodiments herein described, the publisher of the unit of digital content 200 is not the same as the publisher or sponsor of the DRM system 100. Further, the publisher of the unit of digital content may or may not be the same entity as the publisher of trusted code trusted by specific reference in the unit of digital content 200.

Figure 9:
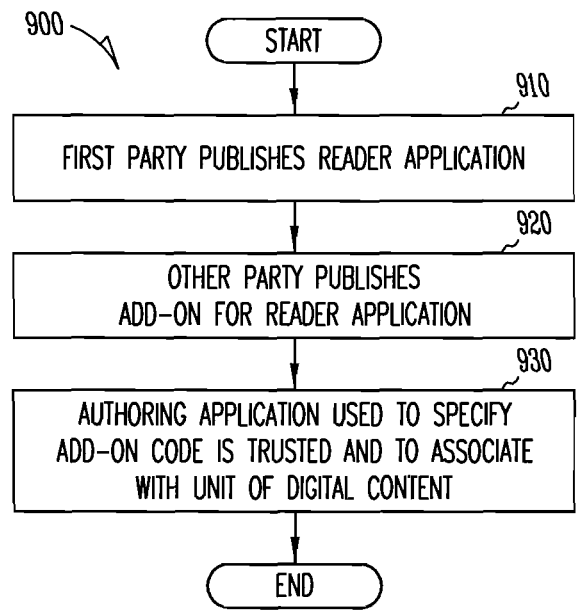
FIGS. 9 and 10 illustrate an example embodiment of a method according to the inventive subject matter disclosed herein.

According to still another example embodiment 900 illustrated in FIG. 9, a first party publishes 910 a reader application 140 that can be used to access a unit of digital content 200. At least one party other than the first party provides 920 plug-in code or other software that adds at least some functionality to the reader application 140. An authoring application 170 is used 930 by an author to create units of digital content 200 and to associate trusted code information 260 with units of digital content 200, wherein the trusted code information 260 specifies if the plug-in code or other software provided by the at least one other party is permitted to access the authored unit of digital content 200.

Figure 10:
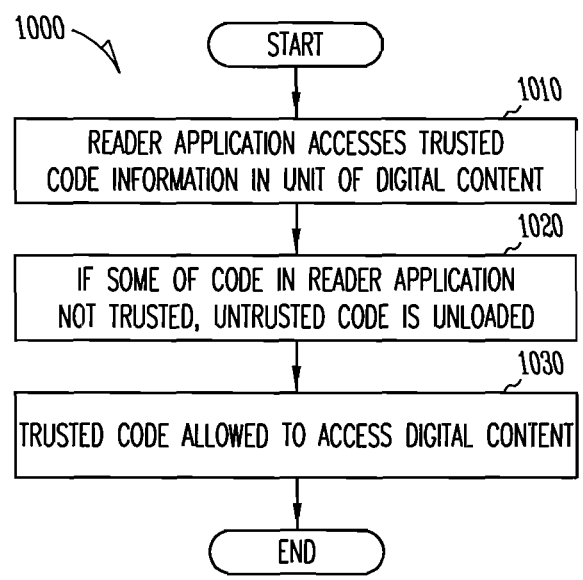

According to still another example embodiment 1000 illustrated in FIG. 10, a reader application 140 accesses 1010 trusted code information 260 embedded or otherwise associated with in a unit of digital content 200. If the trusted code information does not trust at least some of the code of the reader application 140, the code that is not trusted is unloaded or disabled 1020, for example by terminating the reader application 140 and restarting or re-loading it. If the remaining code is trusted, then the reloaded reader application 140 is permitted to proceed 1030 to read the unit of digital content 200. According to still another example embodiment, it is not necessary for the reader application 140 to restart or reload, but instead the un-trusted code is unloaded or disabled while the reader application 140 remains installed.

Thus, as described above, in one example embodiment, if the reader application 140 accesses the unit of digital content 200, and the unit 200 includes a trusted code list 420, the reader application 140 requires any code accessing the digital content in unit 200 to either be trusted pursuant to the trusted code list 420, or trusted pursuant to other trust mechanisms provided by the digital rights management system 100. For example, the unit of digital content 200 may require that the main reader application 140 be trusted globally by the digital rights management system 100 for access of any and all digital content accessed using the reader application 140, and that other code associated with the main reader application 140, such as plug-in code, be trusted pursuant to a digital certificate 430 applicable only to a particular unit of digital content 200 that specifies that such plug-in code may be trusted. According to still another example embodiment, if the trusted code list 420 is embedded or otherwise included in the unit 200, the reader application 140 accesses the list 420 from the unit 200. In an alternative embodiment, the trusted code list 420 may be referenced or identified in the unit of digital content 200, and kept on the policy server 110, from where it can be retrieved by the reader application 140, along with any applicable certificates 430, to be accessed and applied.

Thus, as described herein, according to one example embodiment, an author or publisher of a digital document or unit of digital content 200 may sign plug-in code they wish to trust with their own certificate, and the certificate can be embedded in the unit of digital content 200, for example along with a certificate provided by the publisher of the DRM system. The author or publisher thus enables both the reader application 140 for a DRM system 100 they can trust to read the content 200, and also enable the plug-in code they have signed to also be used to access the content 200. In another embodiment, the author may be independent of the distributor of the trusted code they wish to specify in the unit of digital content 200. Accordingly, in this embodiment, various third parties may provide, for example, plug-in programs for use with a reader application 140, and an author of a unit of digital content 200 may specify any one or more of such plug-in programs for use in accessing the unit of digital content.

Figure 11:
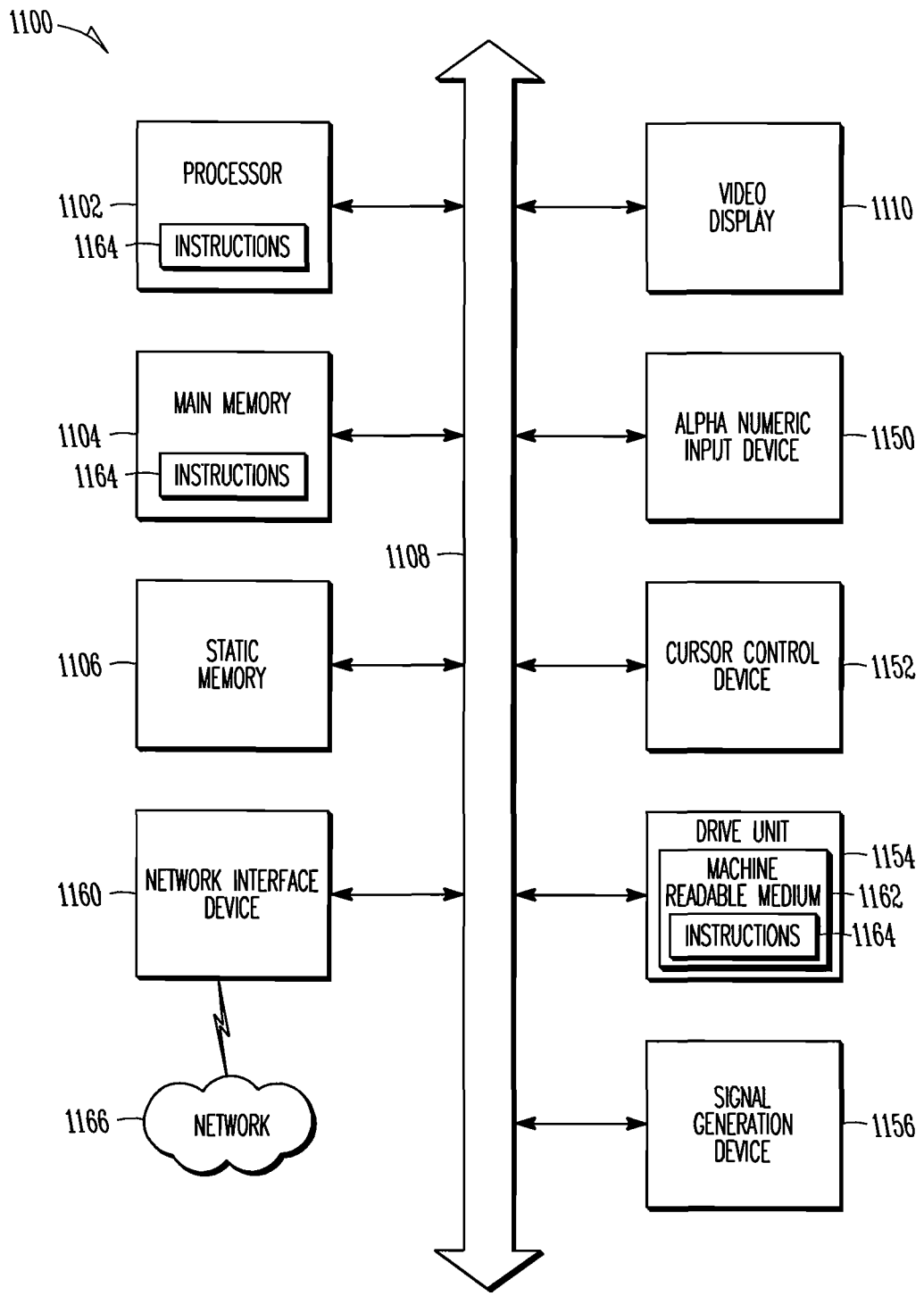
FIG. 11 illustrates a diagram of one example embodiment of a computing system architecture according to the inventive subject matter disclosed herein.

FIG. 11 shows a diagrammatic representation of a machine in the example form of a computer system 1100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1150 (e.g., a keyboard), a cursor control device 1152 (e.g., a mouse), a disk drive unit 1154, a signal generation device 1156 (e.g., a speaker), and a network interface device 1160. The disk drive unit 1154 includes a machine-readable medium 1162 on which is stored one or more sets of instructions, and data structures (e.g., software) 1164 embodying or utilized by any one or more of the methodologies or functions described herein. The instructions 1164 may also reside, completely or at least partially, within the main memory 1104 and/or within the processor 1102 during execution thereof by the computer system 1100, the main memory 1104 and the processor 1102 also constituting machine-readable media. The instructions 1164 may further be transmitted or received over a network 1166 via the network interface device 1160 utilizing any one of a number of well-known transfer protocols, for example the hyper text transfer protocol (HTTP).

While the machine-readable medium 1162 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

In this description, numerous specific details are set forth. However, it is understood that embodiments of the invention may be practiced without these specific details. In other instances, well-known circuits, software, structures, and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the inventive subject matter can include any variety of combinations and/or integrations of the embodiments described herein. Each claim, as may be amended, constitutes an embodiment of the inventive subject matter, incorporated by reference into the detailed description. Moreover, in this description, the phrase "exemplary embodiment" means that the embodiment being referred to serves as an example or illustration. Further, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with reference to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

What is claimed is:

1. A computer-implemented method comprising:
opening, by a reader application, a unit of digital content, the reader application in communication with a digital rights management system;
accessing, by the reader application, a trusted code information comprised in the unit of digital content,
in response to determining, by the reader application, that, a trusted code is not trusted by the digital rights management system to access the unit of digital content, determining, by the reader application, based on the trusted code information, whether the trusted code is trusted to access the unit of digital content; and
in response to determining, by the reader application, that the trusted code information indicates that the trusted code is trusted to access the unit of digital content, enabling, by the reader application, the trusted code to access the unit of digital content.

2. The method of claim 1, further comprising:
unloading or disabling, by the reader application, the trusted code from the reader application in response to determining that the trusted code is not permitted to access the unit of digital content.

3. The method of claim 1, further comprising:
retrieving, by the reader application, a public key and a digital certificate from the trusted code information; and
verifying, by the reader application, whether the trusted code is trusted to access the unit of digital content based at least in part on the public key and the digital certificate.

4. The method of claim 1, wherein the opening comprises opening the unit of digital content by the reader application provided by a first party, and wherein the determining the trusted code is trusted to access the unit of content based on the trusted code information comprises determining whether the trusted code provided by a second party is trusted to access the unit of digital content.

5. The method of claim 1, wherein the opening comprises opening an electronic document or a digital music file.

6. The method of claim 1, wherein the trusted code comprises a loadable library, and wherein the determining the trusted code is trusted to access the unit of content based on the trusted code information comprises determining whether the loadable library is trusted to access the unit of digital content.

7. The method of claim 1, wherein the determining comprise determining whether the trusted code that works in conjunction with the reader application to add functionality to functionality provided by the reader application is trusted to access the unit of digital content.

8. A computer-readable non-transitory storage medium having a plurality of instructions configured to enable a processor, in response to execution of the plurality of instructions by the processor to:
enable a reader application to access a unit of digital content associated with at least one characteristic of a digital rights management scheme;
enable the reader application to determine that the digital rights management scheme does not trust a trusted code that adds functionality to functionality provided by the reader application to access the unit of digital content;
enable the reader application to access a trusted code information comprised in the unit of digital content;
enable the reader application to determine, based on the trusted code information, whether the trusted code is permitted to access the unit of digital content; and
enable the reader application to selectively permit the trusted code to access the unit of digital content in response to a result of the determining whether the trusted code is permitted to access the unit of digital content.

9. The computer-readable non-transitory storage medium of claim 8, wherein the plurality of instructions are configured to enable the processor, in response to execution of the plurality of instructions by the processor, to:
unload or disable the trusted code from the reader application in responsive to determining that the trusted code is not permitted to access the unit of digital content.

10. The computer-readable non-transitory storage medium of claim 8, wherein the plurality of instructions are configured to enable the processor, in response to execution of the plurality of instructions by the processor, to:
enable the reader application to retrieve a plurality of identifications corresponding to a plurality of respective trusted code from the trusted code information; and
enable the reader application to determine whether the trusted code is one of the plurality of respective trusted code from the trusted code information.

11. The computer-readable non-transitory medium of claim 8, wherein the plurality of instructions are configured to enable the processor, in response to execution of the plurality of instructions by the processor, to:
provide a user interface for a publisher of the unit of digital content to select one or more trusted code from a plurality of trusted code to be permissible trusted code to access the unit of digital content.

12. The computer-readable non-transitory medium of claim 8, wherein the plurality of instructions are configured to enable the processor, in response to execution of the plurality of instructions by the processor, to:
enable a publisher of the unit of digital content to sign the trusted code with a private key of the publisher; and
enable the publisher to include a certificate with a public key corresponding to the private key in the trusted code information comprised in the unit of digital content.

13. The computer-readable non-transitory medium of claim 8, wherein the plurality of instructions are configured to enable the processor, in response to execution of the plurality of instructions by the processor, to:
- enable the reader application to retrieve a public key and a digital certificate from the trusted code information; and
- enable the reader application to verify whether the trusted code is trusted to access the unit of digital content based at least in part, on the public key and the digital certificate.

* * * * *